(12) United States Patent
Keithley

(10) Patent No.: US 10,068,289 B2
(45) Date of Patent: *Sep. 4, 2018

(54) METHOD AND SYSTEM FOR OFFERING A CREDIT PRODUCT BY A CREDIT ISSUER TO A CONSUMER AT A POINT-OF-SALE

(71) Applicant: PayPal, Inc., San Jose, CA (US)

(72) Inventor: Thomas H. Keithley, Monkton, MD (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,090

(22) Filed: Jun. 20, 2017

(65) Prior Publication Data

US 2017/0372418 A1    Dec. 28, 2017

Related U.S. Application Data

(63) Continuation of application No. 15/231,203, filed on Aug. 8, 2016, now Pat. No. 9,684,931, which is a (Continued)

(51) Int. Cl.
*G06Q 40/00* (2012.01)
*G06Q 40/02* (2012.01)
(Continued)

(52) U.S. Cl.
CPC .......... *G06Q 40/025* (2013.01); *G06Q 20/02* (2013.01); *G06Q 20/202* (2013.01);
(Continued)

(58) Field of Classification Search
CPC .............................. G06Q 40/025; G06Q 40/00
(Continued)

(56) References Cited

U.S. PATENT DOCUMENTS 3,920,908 A    11/1975    Kraus
4,191,860 A    3/1980    Weber
(Continued)

FOREIGN PATENT DOCUMENTS

EP    0338568    10/1989
EP    0829813    3/1998
(Continued)

OTHER PUBLICATIONS

"Citibank Introduces New Shell MasterCard(R) Featuring Rebates on Shell Gas, Other Purchases.", PR Newswire, Jan. 27, 2003, 3 pages, PR Newswire Association LLC, Los Angeles, CA.
(Continued)

*Primary Examiner* — Edward Chang
(74) *Attorney, Agent, or Firm* — Haynes and Boone, LLP

(57) ABSTRACT

A method for offering at least one credit product by at least one credit issuer to a consumer at a point-of-sale between a merchant and the consumer. The method includes the steps of: providing a credit issuer data set including a plurality of data fields to a central database; initiating a transaction between the consumer and the merchant at the point-of-sale; offering, to the consumer at the point-of-sale, the at least one credit product; and presenting, to the consumer at the point-of-sale, at least one data field in the credit issuer data set. The at least one data field presented to the consumer is populated with data directed to the credit product, the credit issuer, or any combination thereof. An apparatus and system are also disclosed.

20 Claims, 5 Drawing Sheets

Related U.S. Application Data continuation of application No. 14/245,964, filed on Apr. 4, 2014, now Pat. No. 9,412,132, which is a continuation of application No. 14/047,791, filed on Oct. 7, 2013, now Pat. No. 8,719,159, which is a continuation of application No. 11/651,141, filed on Jan. 9, 2007, now Pat. No. 8,554,669.

(51) Int. Cl.
  *G06Q 20/02* (2012.01)
  *G06Q 20/20* (2012.01)
  *G06Q 30/02* (2012.01)
  *G06Q 30/06* (2012.01)

(52) U.S. Cl.
  CPC ..... *G06Q 30/0215* (2013.01); *G06Q 30/0601* (2013.01); *G06Q 30/0603* (2013.01); *G06Q 40/00* (2013.01)

(58) Field of Classification Search
  USPC .................................................. 705/39, 35
  See application file for complete search history.

(56) References Cited

U.S. PATENT DOCUMENTS

| | | | |
|---|---|---|---|
| 4,291,198 A | 9/1981 | Anderson et al. | |
| 4,757,267 A | 7/1988 | Riskin | |
| 4,969,183 A | 11/1990 | Reese | |
| 4,996,705 A | 2/1991 | Entenmann et al. | |
| 5,010,238 A | 4/1991 | Kadono et al. | |
| 5,012,077 A | 4/1991 | Takano | |
| 5,120,945 A | 6/1992 | Nishibe et al. | |
| 5,329,589 A | 7/1994 | Fraser et al. | |
| 5,446,885 A | 8/1995 | Moore et al. | |
| 5,537,315 A | 7/1996 | Mitcham | |
| 5,793,028 A | 8/1998 | Wagener et al. | |
| 5,794,221 A | 8/1998 | Egendorf | |
| 5,866,889 A | 2/1999 | Weiss et al. | |
| 5,870,721 A | 2/1999 | Norris | |
| 5,883,810 A | 3/1999 | Franklin et al. | |
| 5,940,811 A | 8/1999 | Norris | |
| 6,000,832 A | 12/1999 | Franklin et al. | |
| 6,014,645 A * | 1/2000 | Cunningham | G06Q 20/363 |
| | | | 235/379 |
| 6,029,150 A | 2/2000 | Kravitz | |
| 6,029,890 A | 2/2000 | Austin | |
| 6,032,136 A | 2/2000 | Brake, Jr. et al. | |
| 6,078,891 A | 6/2000 | Riordan et al. | |
| 6,098,053 A | 8/2000 | Slater | |
| 6,105,007 A | 8/2000 | Norris | |
| 6,122,624 A | 9/2000 | Tetro et al. | |
| 6,188,994 B1 | 2/2001 | Egendorf | |
| 6,202,053 B1 | 3/2001 | Christiansen et al. | |
| 6,227,447 B1 | 5/2001 | Campisano | |
| 6,289,319 B1 | 9/2001 | Lockwood | |
| 6,317,783 B1 * | 11/2001 | Freishtat | G06F 17/30867 |
| | | | 707/999.01 |
| 6,324,524 B1 | 11/2001 | Lent et al. | |
| 6,332,134 B1 | 12/2001 | Foster | |
| 6,341,724 B2 | 1/2002 | Campisano | |
| 6,351,739 B1 | 2/2002 | Egendorf | |
| 6,477,578 B1 | 11/2002 | Mhoon | |
| 6,505,171 B1 | 1/2003 | Cohen et al. | |
| 6,675,153 B1 | 1/2004 | Cook et al. | |
| 6,704,714 B1 | 3/2004 | O'Leary et al. | |
| 6,785,661 B1 | 8/2004 | Mandler et al. | |
| 6,820,202 B1 | 11/2004 | Wheeler et al. | |
| 6,839,690 B1 | 1/2005 | Foth et al. | |
| 6,839,692 B2 | 1/2005 | Carrott et al. | |
| 6,868,408 B1 | 3/2005 | Rosen | |
| 6,883,022 B2 | 4/2005 | Van Wyngarden | |
| 6,889,325 B1 | 5/2005 | Sipman et al. | |
| 6,915,272 B1 | 7/2005 | Zilliacus et al. | |
| 6,931,382 B2 | 8/2005 | Laage et al. | |
| 6,957,334 B1 | 10/2005 | Goldstein et al. | |
| 6,970,853 B2 | 11/2005 | Schutzer | |
| 6,976,008 B2 | 12/2005 | Egendorf | |
| 6,980,970 B2 | 12/2005 | Krueger et al. | |
| 7,006,986 B1 | 2/2006 | Sines et al. | |
| 7,039,603 B2 * | 5/2006 | Walker | G06Q 20/00 |
| | | | 705/14.13 |
| 7,051,001 B1 | 5/2006 | Slater | |
| 7,107,243 B1 | 9/2006 | McDonald et al. | |
| 7,177,836 B1 | 2/2007 | German et al. | |
| 7,191,939 B2 * | 3/2007 | Beck | G06Q 20/105 |
| | | | 235/379 |
| 7,249,076 B1 * | 7/2007 | Pendleton | G06Q 20/10 |
| | | | 705/35 |
| 7,263,506 B2 | 8/2007 | Lee et al. | |
| 7,406,442 B1 | 7/2008 | Kottmeier, Jr. et al. | |
| 2001/0034702 A1 | 10/2001 | Mockett et al. | |
| 2001/0034724 A1 | 10/2001 | Thieme | |
| 2002/0007302 A1 | 1/2002 | Work et al. | |
| 2002/0007341 A1 | 1/2002 | Lent et al. | |
| 2002/0032860 A1 | 3/2002 | Wheeler et al. | |
| 2002/0035538 A1 | 3/2002 | Moreau | |
| 2002/0069166 A1 | 6/2002 | Moreau et al. | |
| 2002/0087467 A1 | 7/2002 | Mascavage, III et al. | |
| 2002/0099649 A1 | 7/2002 | Lee et al. | |
| 2002/0107793 A1 | 8/2002 | Lee | |
| 2002/0112160 A2 | 8/2002 | Wheeler et al. | |
| 2002/0120537 A1 | 8/2002 | Morea et al. | |
| 2002/0120864 A1 | 8/2002 | Wu et al. | |
| 2002/0156688 A1 | 10/2002 | Horn et al. | |
| 2002/0178071 A1 | 11/2002 | Walker et al. | |
| 2002/0198822 A1 | 12/2002 | Munoz et al. | |
| 2003/0036996 A1 | 2/2003 | Lazerson | |
| 2003/0061157 A1 | 3/2003 | Hirka et al. | |
| 2003/0120615 A1 | 6/2003 | Kuo | |
| 2003/0144952 A1 | 7/2003 | Brown et al. | |
| 2003/0149656 A1 | 8/2003 | Magruder et al. | |
| 2003/0200184 A1 | 10/2003 | Dominguez et al. | |
| 2004/0078328 A1 | 4/2004 | Talbert et al. | |
| 2004/0111362 A1 | 6/2004 | Nathans et al. | |
| 2004/0151292 A1 | 8/2004 | Larsen | |
| 2004/0186807 A1 | 9/2004 | Nathans et al. | |
| 2005/0038715 A1 | 2/2005 | Sines et al. | |
| 2005/0043993 A1 * | 2/2005 | Stollman | G06Q 30/02 |
| | | | 705/14.14 |
| 2005/0071266 A1 | 3/2005 | Eder | |
| 2005/0125336 A1 * | 6/2005 | Rosenblatt | G06Q 20/10 |
| | | | 705/39 |
| 2005/0131808 A1 | 6/2005 | Villa | |
| 2005/0246278 A1 | 11/2005 | Gerber et al. | |
| 2006/0064372 A1 | 3/2006 | Gupta | |
| 2006/0106699 A1 | 5/2006 | Hitalenko et al. | |
| 2006/0178988 A1 | 8/2006 | Egendorf | |
| 2006/0184428 A1 | 8/2006 | Sines et al. | |
| 2006/0184449 A1 | 8/2006 | Eder | |
| 2006/0184570 A1 | 8/2006 | Eder | |
| 2006/0229974 A1 | 10/2006 | Keithley et al. | |
| 2006/0229996 A1 | 10/2006 | Keithley et al. | |
| 2006/0248016 A1 | 11/2006 | Ginter et al. | |
| 2006/0265335 A1 * | 11/2006 | Hogan | G06Q 20/20 |
| | | | 705/65 |
| 2006/0266819 A1 | 11/2006 | Sellen et al. | |
| 2006/0289621 A1 | 12/2006 | Foss, Jr. et al. | |
| 2007/0005445 A1 | 1/2007 | Casper | |
| 2007/0038485 A1 | 2/2007 | Yeransian et al. | |
| 2007/0056019 A1 | 3/2007 | Allen et al. | |
| 2007/0063017 A1 | 3/2007 | Chen et al. | |
| 2007/0073889 A1 | 3/2007 | Morris | |
| 2007/0080207 A1 | 4/2007 | Williams | |
| 2007/0094095 A1 | 4/2007 | Kilby | |
| 2007/0094114 A1 | 4/2007 | Bufford et al. | |
| 2007/0250919 A1 | 10/2007 | Shull et al. | |
| 2007/0288375 A1 * | 12/2007 | Talbert | G06Q 20/02 |
| | | | 705/44 |
| 2008/0033775 A1 | 2/2008 | Dawson et al. | |
| 2008/0040275 A1 | 2/2008 | Paulsen et al. | |
| 2008/0046334 A1 | 2/2008 | Lee et al. | |
| 2008/0052244 A1 | 2/2008 | Tsuei et al. | |
| 2008/0195528 A1 | 8/2008 | Keithley | |

(56) References Cited

U.S. PATENT DOCUMENTS

2008/0203153 A1    8/2008   Keithley et al.
2008/0208760 A1    8/2008   Keithley
2008/0272188 A1   11/2008   Keithley et al.

FOREIGN PATENT DOCUMENTS

| EP | 1223524 | 7/2002 |
|---|---|---|
| WO | WO88/10467 | 12/1988 |
| WO | WO00/02150 | 1/2000 |
| WO | WO00/67177 | 11/2000 |
| WO | WO02/23439 | 3/2002 |

OTHER PUBLICATIONS

"GE Re-Ups With Verifone", CardLine, Mar. 3, 2006, 2 pages, vol. 6, No. 9, SourceMedia, Inc., New York City, NY.

\* cited by examiner

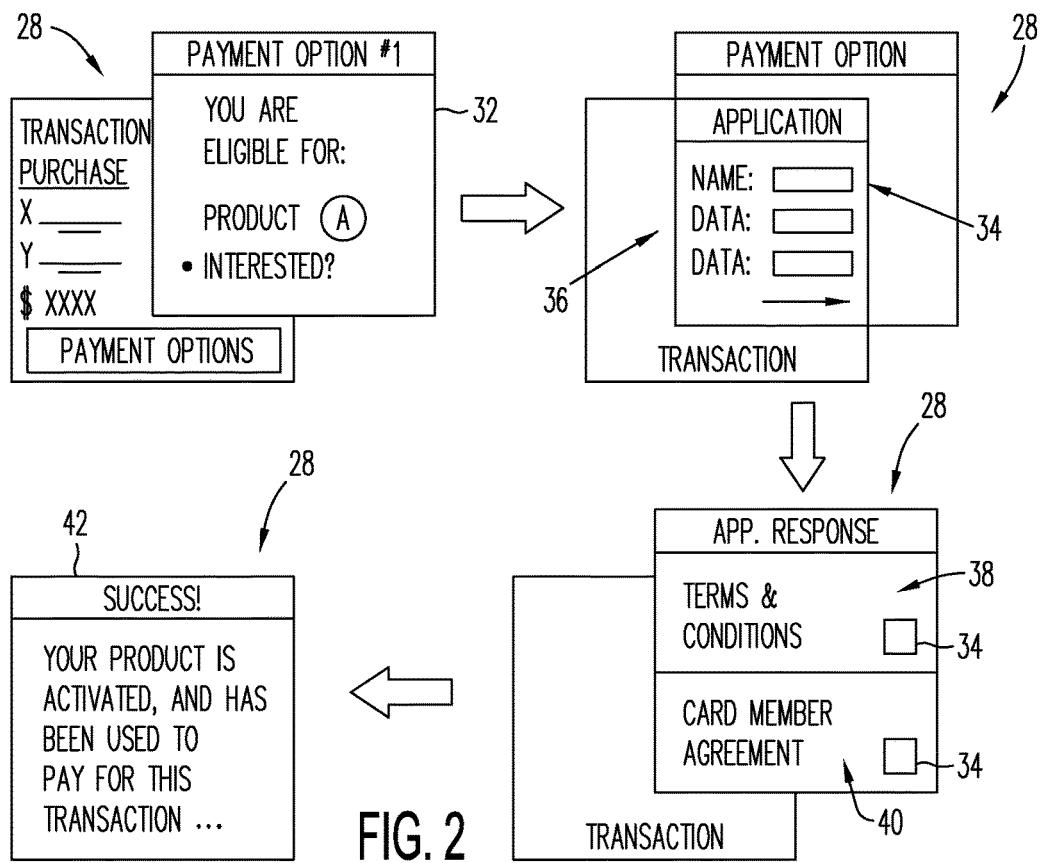
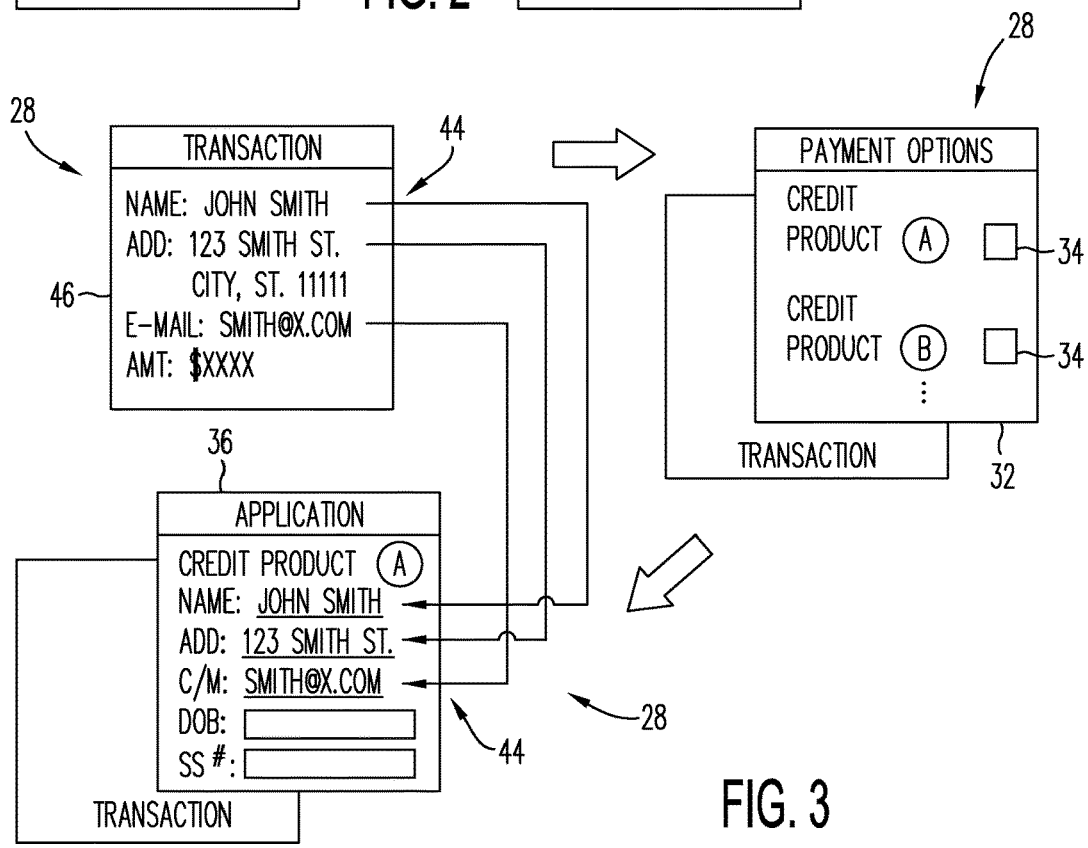

METHOD AND SYSTEM FOR OFFERING A CREDIT PRODUCT BY A CREDIT ISSUER TO A CONSUMER AT A POINT-OF-SALE

CROSS REFERENCE TO RELATED APPLICATIONS

This application is a continuation of U.S. application Ser. No. 15/231,203, filed on Aug. 8, 2016 (issued as U.S. Pat. No. 9,684,931 on Jun. 20, 2017), which is a continuation of U.S. application Ser. No. 14/245,964, filed Apr. 4, 2014 (issued as U.S. Pat. No. 9,412,132 on Aug. 9, 2016), which is a continuation of U.S. application Ser. No. 14/047,791, filed Oct. 7, 2013, (issued as U.S. Pat. No. 8,719,159 on May 6, 2014), which is a continuation of U.S. application Ser. No. 11/651,141, filed Jan. 9, 2007, (issued as U.S. Pat. No. 8,554,669 on Oct. 8, 2013), all of which are incorporated herein by reference in their entirety.

BACKGROUND OF THE INVENTION

Field of the Invention

The present invention is related generally to credit systems and consumer/credit issuer relationships and consumer/merchant relationships, and in particular, to a method and system for offering a credit product by a credit issuer to a consumer at a point-of-sale, such as in a person-to-person environment, online environment, etc.

Description of Related Art

In order to enable convenient purchases of goods and services by consumers, the financial service industry has developed many alternative payment methods that allow a consumer to engage in a transaction and receive goods and services on credit. For example, such alternative payment methods may include checks, ATM or debit cards, credit cards, charge cards, etc. Prior to the birth of virtual commerce, as discussed below, such payment options provided adequate convenience and transactional security to consumers and merchants in the marketplace. Virtual commerce and the growth of the Internet as a medium for commerce have placed pressure on the payment options discussed above on both the convenience and transactional security and profitability by the credit issuer. Currently, available payment options include significant shortcomings when applied to remote purchasers, such as purchases where the buyer and the seller (that is, the merchant) are not physically proximate during the transaction. Specific examples of remote purchases are mail order, telephone order, the Internet and wireless purchases.

In many situations, such as at a typical point-of-sale (POS), and during the transaction, the consumer may wish to obtain some credit product. For example, during an online transaction at a merchant's site, the consumer may wish to obtain a credit product, such as a standard credit card account, an online credit account or some other similar credit vehicle. In addition, the consumer may wish to obtain that credit product for use in the transaction that he or she is currently engaged in with the merchant.

According to the prior art, in such a situation, the consumer applies for the credit card at the home page or some other page of the merchant's site. In some instances the consumer may be responding to some displayed offer of credit issuer on the merchant-affiliated website. For example, the merchant may offer a discount, e.g., 10% discount on all purchases, if the consumer obtains that specific credit product. If the consumer does indeed select the option to apply for that credit product, he or she is directed or re-routed from the merchant's site to the credit issuer website. Such a situation is tenuous for the merchant, since it is never preferable for a potential purchaser to leave the website. In such a situation, if the consumer is displeased with the credit product application process, he or she may simply terminate the entire transaction and find another merchant site. Further, during the application process at the credit issuer website, various technical "glitches" may arise, causing the consumer to be disconnected from the site, misdirected from the credit issuer site, "knocked" offline, etc., all of which is a result of the movement from the merchant site to the credit issuer site.

One reason that the merchant must allow the consumer to be redirected to the credit issuer site is the merchant's lack of pertinent information and data regarding the credit product. For example, the merchant could not provide the appropriate terms and conditions of the credit product, nor the required Credit Member Agreement, both of which must, by law, be presented to the consumer (and acknowledged by the consumer) before establishing the credit account. Instead, this information is presented to the consumer at the credit issuer site, e.g., at the credit issuer application page, since the credit issuer desires to maintain absolute control over this important and dynamic data. The credit issuer may believe that the merchant will not display the information in the required format, will not update the information in a timely, complete and accurate manner, will not obtain the required acknowledgements, etc.

Another drawback to the prior art is the duplicative information required from the consumer during both the transaction and the credit application process. Since the consumer is directed from the merchant's site to the credit issuer's application page, many different data fields will require entry at both sites, again causing a less-than-desirable online experience by the consumer. For example, during the transaction, the consumer may have already supplied to the merchant his or her name, address, telephone number, e-mail, billing address, ship-to address, etc. Then, during the credit application phase on the credit issuer's site, the consumer must again enter all of this information, since the merchant site and the credit issuer site are separate. This represents a deficiency in the consumer/merchant/credit issuer relationship.

SUMMARY OF THE INVENTION

Therefore, it is an object of the present invention to provide a method and system for offering a credit product by a credit issuer to a consumer at a point-of-sale that overcomes the drawbacks and deficiencies of the prior art. It is another object of the present invention to provide a method and system for offering a credit product by a credit issuer to a consumer at a point-of-sale that maximizes the consumer online experience. It is yet another object of the present invention to provide a method and system for offering a credit product by a credit issuer to a consumer at a point-of-sale that ensures that the most timely, complete and accurate credit product information is presented to the consumer. It is a still further object of the present invention to provide a method and system for offering a credit product by a credit issuer to a consumer at a point-of-sale that ensures that the appropriate acknowledgements and consumer interactions are obtained. It is a further object of the present invention to provide a method and system for offering a credit product by a credit issuer to a consumer at a point-of-sale that allows the credit issuer to maintain control over the credit product data, while allowing the merchant to retain the consumer interaction. It is a still further object of the present invention to provide a method and system for offering a credit product by a credit issuer to a consumer at a point-of-sale that allows for the pre-population of certain consumer data in the credit application phase of a consumer/credit issuer transaction.

The present invention is directed to a method for offering at least one credit product by at least one credit issuer to a consumer at a point-of-sale between a merchant and the consumer. The method includes the steps of: providing a credit issuer data set including a plurality of data fields to a central database; initiating a transaction between the consumer and the merchant at the point-of-sale; offering, to the consumer at the point-of-sale, the at least one credit product; and presenting, to the consumer at the point-of-sale, at least one data field in the credit issuer data set. The at least one data field presented to the consumer is populated with data directed to the credit product.

The present invention is further directed to an apparatus for offering at least one credit product by at least one credit issuer to a consumer at a point-of-sale between a merchant and the consumer. The apparatus includes: means for providing a credit issuer data set including a plurality of data fields to a central database; means for initiating a transaction between the consumer and the merchant at the point-of-sale; means for offering, to the consumer at the point-of-sale, the at least one credit product; and means for presenting, to the consumer at the point-of-sale, at least one data field in the credit issuer data set. At least one data field presented to the consumer is populated with data directed to the credit product.

The present invention is also directed to a system for offering at least one credit product by at least one credit issuer to a consumer at a point-of-sale between a merchant and the consumer. The system includes a storage mechanism including a central database and at least one input mechanism for transmitting, to the storage mechanism: (i) a credit issuer data set having a plurality of data fields therein; (ii) a request, from the merchant, for at least one data field of the credit issuer data set to be transmitted, or any combination thereof. A processor mechanism processes data input, data requests, data manipulation, data transmission, or any combination thereof, and a communication mechanism is used for transmitting, to the merchant, at least one data field in the central database responsive to the request. Finally, a merchant output mechanism presents, to the consumer at the point-of-sale, the least one data field transmitted from the communication mechanism. At least one data field is populated with data directed to the credit product.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWING(S)

FIG. 2 is a schematic view and illustrative screenshots of another embodiment of a method and system for offering at least one credit product by at least one credit issuer to a consumer at a point-of-sale according to the present invention;

FIG. 3 is a schematic view and illustrative screenshots of a further embodiment of a method and system for offering at least one credit product by at least one credit issuer to a consumer at a point-of-sale according to the present invention;

DESCRIPTION OF THE PREFERRED EMBODIMENT(S)

Figure 1:
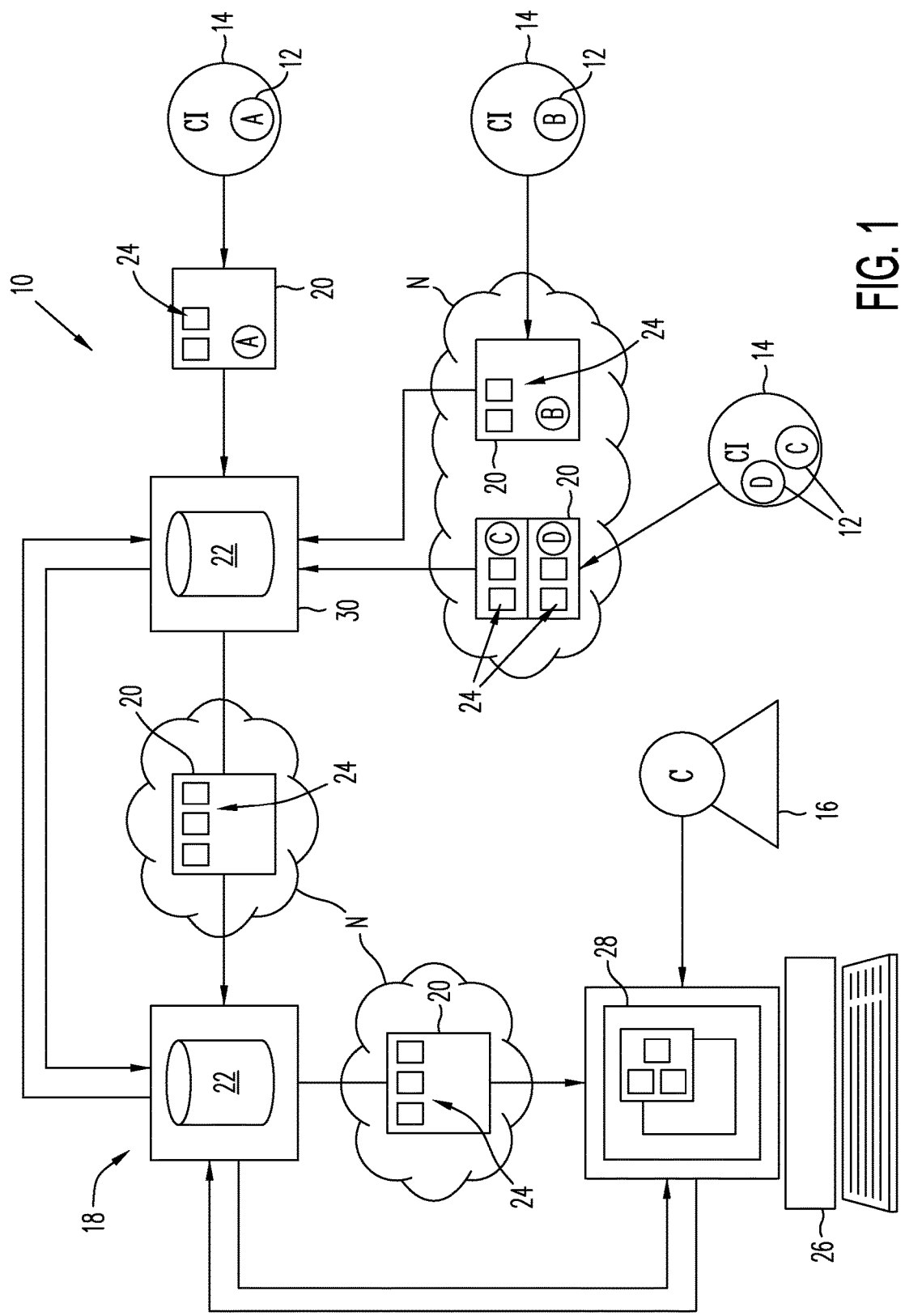
FIG. 1 is a schematic view of one embodiment of a method and system for offering at least one credit product by at least one credit issuer to a consumer at a point-of-sale according to the present invention.

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention is directed to a method and system 10 for use in offering at least one credit product 12 by one or more credit issuers 14 to a consumer 16. In particular, the method and system 10 implement this offer at a point-of-sale between a merchant 18 and the consumer 16. Further, the presently-invented method and system 10 are useful in connection with a variety of credit products, such as credit cards, online credit accounts, debit cards, and other similar credit vehicles. In addition, the method and system 10 of the present invention can be used in connection with a variety and any quantity of credit issuers 14, consumers 16 and merchants 18.

In particular, the present invention provides a credit issuer data set 20 to a central database 22. The credit issuer data set 20 includes multiple data fields 24. Next, a transaction is initiated between the consumer 16 and the merchant 18 at the point-of-sale. One or more credit products 12 are offered to the consumer 16 at the point-of-sale. Finally, one or more data fields 24 in the credit issuer data set 20 are presented to the consumer 16 at the point-of-sale. These data fields 24, which are presented to the consumer 16, are populated with data directed to the credit product 12 and/or the credit issuer 14.

The data fields 24 presented to the consumer 16 at the point-of-sale may be populated with a variety of data and information. For example, these data fields 24 may comprise terms relating to the credit product 12, conditions relating to the credit product 12, card member agreement data, credit product offer data, credit issuer data, application data, etc. Accordingly, during the offering step and/or the presenting step, multiple data fields 24 from the credit issuer data set 20 are provided to the consumer 16 during the transaction at the point-of-sale. In one preferred form, the multiple data fields 24 are populated with data reflecting terms and conditions relating to the credit product 12, as well as a card member agreement data form.

By providing certain data fields 24 to the consumer 16 at the point-of-sale, the consumer 16 does not need to directly access the credit issuer 14 in order to obtain the credit product 12. Instead, the information and data is either provided to or through the merchant 18 to the consumer 16 at the point-of-sale. This alleviates the need for any direct communication, access or movement to the credit issuer 14. In addition, the presently-invented system 10 provides the merchant 18 with the unique advantage of maintaining and retaining the consumer 16 at the point-of-sale at all times during the transaction, as well as during any credit transaction or credit product 12 presentation, application and consummation between the consumer 16 and the credit issuer 14.

In one preferred and non-limiting embodiment, and as illustrated in schematic form in FIG. 1, the present method and system 10 is useful in connection with an electronic transaction between the consumer 16 and the merchant 18. Accordingly, the point-of-sale would be an online location of the merchant 18, such as a website, web page or other online location. In this embodiment, the offering step and/or the presenting step may include displaying a web page, an electronic document, a window, a popup window, etc., which displays the data fields 24 to the consumer 16.

As seen in FIG. 1, the consumer 16 accesses the merchant's 18 online location through a computing device 26, such as a personal computer, a laptop, a PDA, a cellular phone, an electronic device or other means of communication. Accordingly, some time during the transaction process between the merchant 18 and the consumer 16, the consumer 16 encounters or utilizes an interactive interface 28, which allows information, such as the data fields 24, to be presented to the consumer 16, as well as allows for various consumer 16 input to the system 10.

In the embodiment of FIG. 1, the merchant 18 provides the credit issuer data set 20 and/or various data fields 24 from the data set 20 to the consumer 16 via the interactive interface 28, as well as over a network N. In this manner, since the merchant 18 has the credit issuer data set 20 available for offer and presentation to the consumer 16, the consumer 16 does not need to be redirected to the credit issuer 14, such as the credit issuer 14 site online.

It is envisioned that the central database 22 be either maintained at the merchant 18 location or site, however, more preferably at a central system 30 site, which is accessible by and/or in communication with the merchant 18. While, as discussed above, the central database 22 may be stored locally on the merchant 18 site, this may give rise to various security concerns on both the credit issuer 14 side as well as the merchant 18 side. For example, the merchant 18 may not desire to have some updateable and dynamic central database 22 accessible by third parties on their site. On the credit issuer 14 side, the credit issuer 14 may not desire to have the merchant 18 in control of the credit issuer data set 20, as well as the data fields 24 therein. Therefore, it appears preferable to have the central database 22 located at some central and accessible system 30.

Also as seen in FIG. 1, multiple credit issuers 14 may provide their individualized and unique credit issuer data set 20 and data fields 24 to either the central system 30 for entry into the central database 22, or directly into the central database 22. The credit issuer 14 will be in communication with the central system 30 and/or central database 22 through secure systems, online systems, wireless systems, over the network N, etc. However, such an arrangement demonstrates the ability of the credit issuer 14 to access their own information and data fields 24, and provide the updated credit issuer data set 20 to the central database 22 for release to the merchant 18 and eventually the consumer 16. Accordingly, this ensures that the data fields 24 and credit issuer data set 20 are timely, accurate and comply with applicable regulations regarding the credit issuers 14 and merchants 18.

With respect to the interactive interface 28, which is shown in various forms in FIGS. 2 and 3, this interactive interface 28 is in communication with the central database 22, which is located at the merchant site 18 or at the central system 30. Further, this interactive interface 22 is programmed or configured to display the data fields 24, which are populated with data reflecting the credit product 12 offer data 32, to the consumer 16. Further, the interface 28 allows for or accepts consumer 16 input data 34.

Accordingly, as seen in the illustrative screen shots of FIG. 2, some offer data 32 may be presented to the consumer 16 during the transaction, such as an indication that the consumer 16 is eligible for a specific credit product 12 or multiple credit products 12. In this case, the consumer input data 34 would be some response to this offer data 32, such as whether the consumer 16 is interested or not interested. Next, the interactive interface 28 is in communication with the central database 22 and used for displaying the data fields 24 populated with data reflecting credit product application data 36. Such application data 36 would include the data fields and requests necessary for the consumer 16 to complete an application for the credit product 12 for delivery to the credit issuer 14 via the merchant 18. In addition, the input data 34 from the consumer 16 will also be accepted at this screen or portion of the transaction, and will be responsive to the application data 36 and questions on the application.

Further, as seen in FIG. 2, the interactive interface 28 is in communication with the central database 22 and used to display data fields 24 populated with data reflecting terms and conditions data 38 relating to the credit product 12, and/or card member agreement data 40, also relating to the credit product 12. This terms and conditions data 38 and card member agreement data 40 would be presented or displayed to the consumer 16 after processing of the input data 34 of the consumer 16 related to the application and application data 36 of the credit product 12. In response to this terms and conditions data 38 and card member agreement data 40, the consumer 16 provides additional input data 34, such as an acknowledgment that he or she has read, understood and agrees to the terms and conditions data 38 and card member agreement data 40.

Finally, in one preferred and non-limiting embodiment, result data 42 is presented or provided to the consumer 16. For example, this result data 42 may include some indication of success of the establishment of the credit product 12 account, or even, as shown in FIG. 2, an indication that the credit product 12 has been activated and has been used in connection with the present transaction, thereby completing the transaction. Importantly, all of these consumer 16/merchant 18/credit issuer 14 interactions have occurred directly at the interactive interface 28 and in connection with the merchant 18 website or point-of-sale, without the requirement for communications between the consumer 16 and the credit issuer 14, or a redirect to the credit issuer 14 site.

As discussed above, the interactive interface 28 is in communication with the central database 22, whether the central database 22 is located at the merchant 18 point-of-sale (or site) or the central system 30 location (or site). In addition, the interface 28 is programmed or configured to appropriately format and display various data fields populated with data. For example, such data may include interest rate data, credit limit data, purchase data, charge data, cost data, expense data, annual fee data, interest accrual data, statement data, account data, fund advancement data, transfer data, delinquency data, payment term data, account review data, credit product data, credit issuer data, contract data, liability data, certification data, privacy data, personal information use data, collected information data, consent data, foreign data, access data, online service data, phone service data, liability data, representation data, warranty data, termination data, indemnity data, term variation data, communication data, assignment data, rights data, governing law data, or any combination thereof.

In another embodiment, and as discussed above, the interface 28 is in communication with the central system 30, such as a consumer processing system, which either is in communication with or acts as the repository for the central database 22. Further, other than merely housing the central database 22, the central system 30 may have additional functionality. For example, the central system 30 may be programmed or configured to authenticate the consumer 16, verify the consumer 16, approve or deny a consumer 16 application (based upon the consumer input data 34), verify the transaction, process consumer 16 data, process merchant 18 data, process credit issuer 14 data, process transaction data and/or process credit product 12 data. Accordingly, the central system 30 may be capable of engaging in the various verification, authentication and similar functions with respect to the consumers 16, merchants 18 and credit issuers 14.

As discussed above, the consumer input data 34 may be provided by the consumer 16 to the central system 30, central database 22, merchant 18 and/or credit issuer 14 as responsive to offer data 32, application data 36, terms and conditions data 38, card member agreement data 40, result data 42, etc. For example, the consumer input data 34 may include multiple data fields populated with data reflecting a name, a consumer key, a consumer identification, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, consumer type, a company identity, a merchant identity, previous transaction data, geographical data, credit account data, bankcard balance data, delinquency data, credit segment data, previous transaction data, time between transactions data, previous transaction amount, previous transaction approval status, previous transaction time stamp data, a response code, consumer payment method, consumer payment history, consumer account history, consumer credit account balance, income data, family data, employment data, relationship data, expense data, application data, acknowledgement data, selection data, choice data, or any combination thereof.

In another aspect of the present invention, and as illustrated in FIG. 3, during the transaction, the consumer 16 supplies certain consumer data 44 (such as input data 34) while engaged in certain portions or steps in the transaction process. For example, the consumer 16 may, during the course of the transaction, provide his or her name, address, e-mail, authorized billing amount, bill-to-address, ship-to-address, etc. Therefore, in connection with the present invention, when the data fields 24 are presented to the consumer 16 at the interactive interface 28, such as offer data 32, application data 36, etc., certain information has already been provided by the consumer 16 at the merchant 18 location.

Therefore, and as shown in operation in FIG. 3, the consumer 16 may be provided with one or even a variety of credit products 12, and after selecting the appropriate credit product 12, the application data 36 or application is presented to the consumer 16 at the interactive interface 28. Accordingly, as shown in the example of FIG. 3, the consumer 16 has selected credit product A, and the system 10 has presented the application or application data 36 to the consumer 16. However, various data fields 24, as discussed above, have been obtained from the consumer 16 during the transaction. Therefore, these data fields 24 may be pre-populated at the point of application, and would not require the consumer 16 to duplicate any data entry. In particular, in this embodiment, various consumer data 44 is taken and transferred from a consumer interaction page 46 that has already been completed by the consumer 16 with this consumer data 44. Accordingly, this consumer data 44 is placed in the appropriate portions and data fields 24 of the application. Of course, the consumer 16 may modify this consumer data 44 if desired, however the pre-population provides an extra convenience to the consumer 16 and facilitates a smoother transaction and credit product 12 acquisition process.

The consumer interaction page 46 during the transaction may take various forms. For example, the consumer interaction page 46 may be an application, a survey, a questionnaire, an acknowledgment, a form, a modifiable form, a template, etc. However, due to the locality of the presently-invented method and system 10, namely at the point-of-sale, this consumer data 44 is easily utilized and pre-populated where appropriate.

Figure 4:
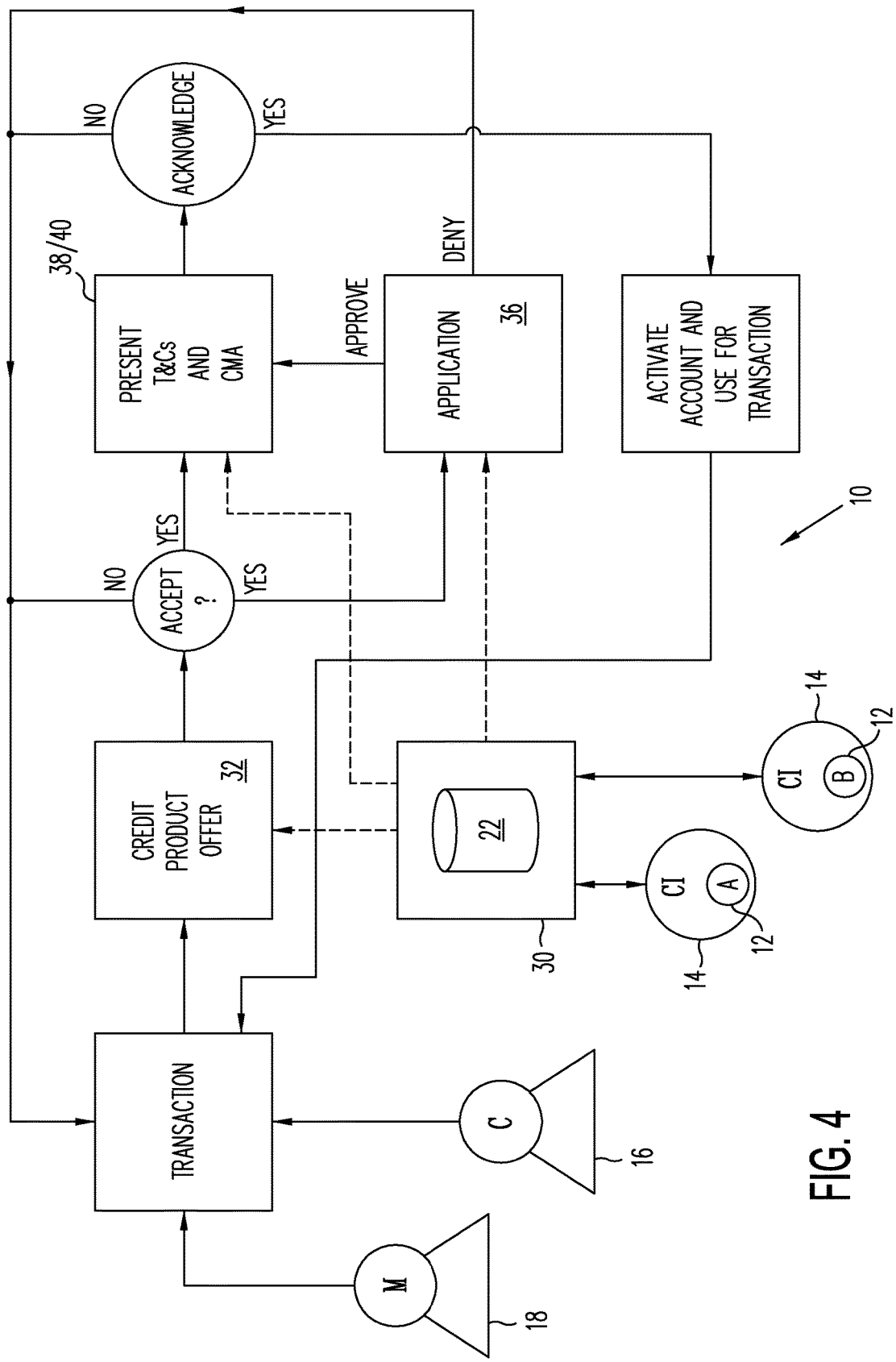
FIG. 4 is a schematic view and flow diagram of another embodiment of a method and system for offering at least one credit product by at least one credit issuer to a consumer at a point-of-sale according to the present invention.

In operation, and as shown in FIG. 4 in schematic form, the consumer 16 and merchant 18 are engaged in a transaction. Next, one or more credit products 12 are offered to the consumer 16 at the point-of-sale of the merchant 18. The appropriate information and data, namely the appropriate data fields 24 of the credit issuer data set 20, is provided to the consumer 16. Next, offer input data 34 is obtained from the consumer 16, which is directed to the credit product 12 offer. If the consumer 16 accepts the offer, the system 10 next presents, to the consumer 16, terms and conditions data 38 and/or card member agreement data 40. Accordingly, responsive to this presentation, the consumer 16 provides additional input data 34, such as acknowledgment input data 34.

Prior to presentation of the terms and conditions data 38 and card member agreement data 40, and as discussed above, an application or application data 36 may be presented or provided to the consumer 16. Therefore, additional application input data 34 is received from the consumer 16. Accordingly, based upon the appropriate processes run at either the merchant 18 site, or more preferably the central system 30 (or even at the credit issuer 14 site), the application is approved or denied based upon the application input data 34. If approved, an account may be established and opened for the consumer 16 for the credit product 12 of the credit issuer 14. However, if denied, some denial data or appropriate indication is delivered or presented to the consumer 16. It is further envisioned that the central system 30 may determine consumer risk data or perform other risk analysis, verification, authentication, etc., based on the offer input data 34, the acknowledgment input data 34, the application input data 34, or any combination thereof.

Figure 5:
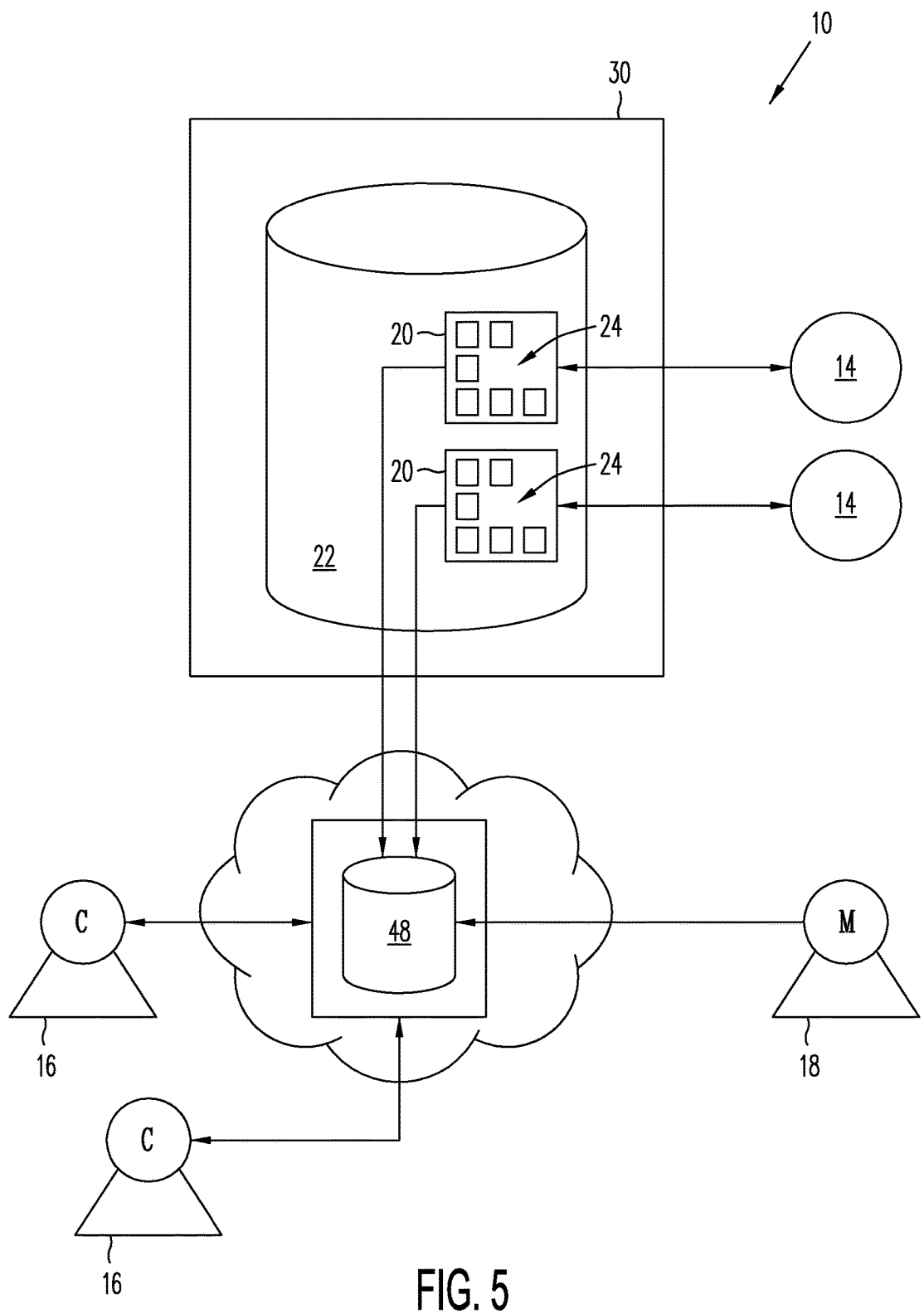
FIG. 5 is a schematic view of yet another embodiment of a method and system for offering at least one credit product by at least one credit issuer to a consumer at a point-of-sale according to the present invention.

Turning to FIG. 5, and in one preferred and non-limiting embodiment, the central database 22 is located or housed within the central system 30. In addition, multiple credit issuers 14 include individual and specified credit issuer data sets 20. For example, these individual credit issuer data sets 20 represent a subset of data including the data fields 24, which are populated with data reflecting the specified credit issuer 14 and/or credit product 12. In one embodiment, the credit issuer 14 is capable of configuring, programming, modifying and otherwise manipulating this subset of data, or specified individual credit issuer data set 20, for the credit issuer 14.

In another embodiment, the credit issuer 14 engages in the transmission of this subset of data or the credit issuer data set 20, in order to maintain absolute control over such data. Therefore, this subset may be equal to the credit issuer data 20 or be another set of data that is modifiable and requires a higher level of access by the credit issuer 14. Of course, any level of credit issuer 14 access to the central database 22 is envisioned, given the appropriate security measures.

In the embodiment of FIG. 5, the individual credit issuer data sets 20 are transmitted to the same or a duplicate central database 22 at the merchant 18 site over the network N. Accordingly, the merchant 18 is in communication with or maintains a merchant database 48, which is in communication with the central database 22. In operation, during the transaction, the subset of data or credit issuer data set 20 is accessible by and through the merchant database 48 for presentation to the consumer 16. In addition, the merchant database 48 may be maintained or updated on a specified basis, a periodic basis, a predetermined basis, a dynamic basis, etc. Accordingly, such a system allows multiple credit issuers 14 to provide multiple credit products 12 to the consumer 16 through the merchant 18 at the point-of-sale.

Figure 6:
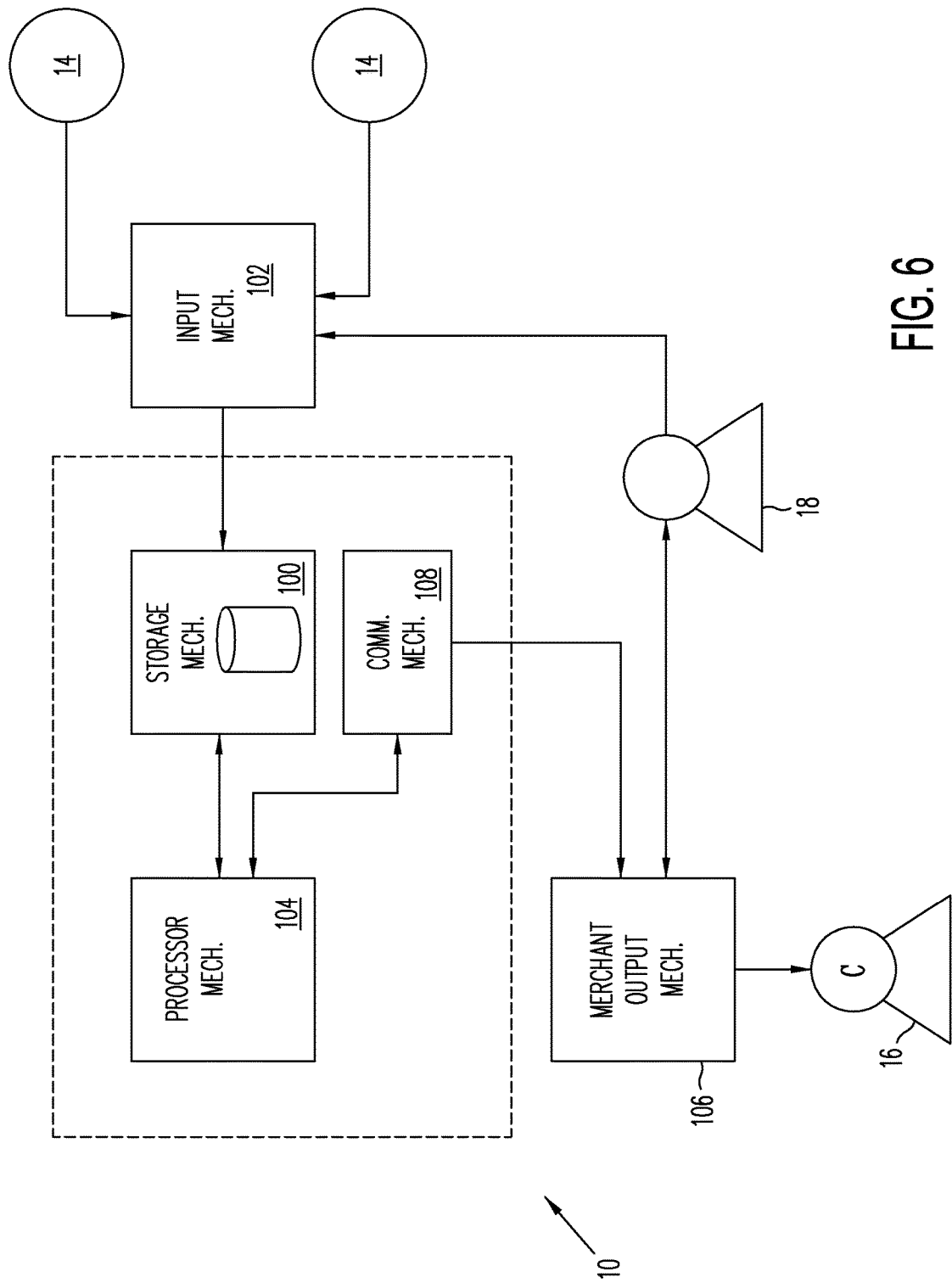
FIG. 6 is a schematic view of a system for offering at least one credit product by at least one credit issuer to a consumer at a point-of-sale according to the present invention.

As seen in FIG. 6, the present invention is also directed to a system 10 for offering at least one credit product 12 by at least one credit issuer 14 to a consumer 16 at a point-of-sale between a merchant 18 and the consumer 16. This system 10 includes a storage mechanism 100, which includes the central database 22. One or more input mechanisms 102 are provided for transmitting, to the storage mechanism 100, the credit issuer data set 20, having the multiple data fields 24 therein. A processor mechanism 104 is included and used and configured or programmed to process data input, data requests, data manipulation, data transmission, etc. A merchant output mechanism 106 is used and configured or programmed to present, to the consumer 16 at the point-of-sale, the one or more data fields 24 of the credit issuer data set 20. In addition, as discussed above, the data fields 24 are populated with data directed to the credit product 12.

The input mechanism 102 may also be used on the merchant 18 side for transmitting a request, from the merchant 18, for the data fields 24 of the credit issuer data set 20. Of course, this assumes the embodiment where the central database 22 and storage mechanism 100 are at the central system 30, as opposed to at the location of or under the control of the merchant 18. In addition, the system 10 may include a communication mechanism 108 for transmitting, to the merchant 18, the data fields 24 and credit issuer data set 20 from the central database 22, which is responsive to the merchant 18 request. Of course it is further envisioned that the credit issuers 14 have an appropriate input mechanism 102 for providing their individualized subsets of data or individualized and specific credit issuer data sets 20 and/or data fields 24 to the central database 22 on the storage mechanism 100.

In this manner, the present invention provides a method and system 10 for offering one or more credit products 12 by one or more credit issuers 14 to a consumer 16 at a point-of-sale with a merchant 18. Accordingly, during the transaction process, appropriate data fields 24 from the credit issuer data set 20 is presented or provided to the consumer 16 at the point-of-sale, and these data fields 24 are timely, accurate, complete and verified by the respective credit issuers 14 for the credit product 12. In an electronic transaction, the consumer 16 does not need to leave, initiate direct communication with or be otherwise directed to a credit issuer 14 site or other third party location. Instead, the merchant 18 maintains control over the consumer 16, but also presents the most appropriate and accurate data fields 24 thereto. Therefore, the present invention provides a seamless and efficient credit transaction between a consumer 16 and a credit issuer 14 at the point-of-sale between the merchant 18 and the consumer 16. In addition, the present invention ensures that the data fields 24 and/or credit issuer data set 20 presented to the consumer 16 meets the approval of the credit issuers 14, who are ultimately in control of these data fields 24.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system comprising:
   one or more computer-readable memories storing program instructions; and
   one or more processors configured to execute the program instructions to cause the system to perform operations comprising:
      providing an online merchant site with access, via a secure network, to information in a central database associated with a third-party credit product, wherein the central database is maintained separate from the online merchant site and one or more servers associated with the third-party, and wherein the online merchant site does not have access to the one or more servers;
      causing the third-party credit product to be presented to a user via a user device involved in a transaction associated with the online merchant site, without redirecting the user device away from the online merchant site;
      receiving a response indicating that the third-party credit product has been selected; and
      processing the response and at least a portion of the transaction without redirecting the user device away from the online merchant site.

2. The system of claim 1, wherein the third party maintains control over data related to the third party credit product.

3. The system of claim 1, wherein the causing the third-party credit product to be presented further comprises causing the online merchant site to access the central database to obtain the information associated with the third-party credit product.

4. The system of claim 1, the operations further comprising:
in response to receiving, from the one or more servers, an update corresponding to the information associated with the third-party credit product, updating a record in the central database corresponding to the information associated with the third-party credit product.

5. The system of claim 1, the operations further comprising providing the one or more servers with access, via the secure network, to the information in the central database associated with the third-party credit product.

6. The system of claim 1, the operations further comprising:
pre-populating user data into one or more fields of an application for the third-party credit product, wherein the user data is obtained from the transaction associated with the online merchant site; and
providing the pre-populated application to the online merchant site for presentation to the user via the user device.

7. A method comprising:
providing an online merchant site with access, via a secure network, to information in a central database associated with a third-party credit product, wherein the central database is maintained separate from the online merchant site and one or more servers associated with the third-party, and wherein the online merchant site does not have access to the one or more servers;
causing the third-party credit product to be presented to a user via a user device involved in a transaction associated with the online merchant site, without redirecting the user device away from the online merchant site;
receiving a response indicating that the third-party credit product has been selected; and
processing the response and at least a portion of the transaction without redirecting the user device away from the online merchant site.

8. The method of claim 7, wherein the third party maintains control over data related to the third party credit product.

9. The method of claim 8, wherein the causing the third-party credit product to be presented further comprises causing the online merchant site to access the central database to obtain the information associated with the third-party credit product.

10. The method of claim 8, further comprising:
in response to receiving, from the one or more servers, an update corresponding to the information associated with the third-party credit product, updating a record in the central database corresponding to the information associated with the third-party credit product.

11. The method of claim 7, further comprising providing the one or more servers with access, via the secure network, to the information in the central database associated with the third-party credit product.

12. The method of claim 11, further comprising:
pre-populating user data into one or more fields of an application for the third-party credit product, wherein the user data is obtained from the transaction associated with the online merchant site; and
providing the pre-populated application to the online merchant site for presentation to the user via the user device.

13. The method of claim 11, the operations further comprising causing a notification indicating that the third-party credit product has been used in association with the transaction to be provided to the user device in response to the processing the response and at least a portion of the transaction.

14. A non-transitory computer readable medium storing program instructions, the program instructions when executed cause a machine to perform operations comprising:
providing an online merchant site with access, via a secure network, to information in a central database associated with a third-party credit product, wherein the central database is maintained separate from the online merchant site and one or more servers associated with the third-party, and wherein the online merchant site does not have access to the one or more servers;
causing the third-party credit product to be presented to a user via a user device involved in a transaction associated with the online merchant site, without redirecting the user device away from the online merchant site;
receiving a response indicating that the third-party credit product has been selected; and
processing the response and at least a portion of the transaction without redirecting the user device away from the online merchant site.

15. The non-transitory computer-readable medium of claim 14, wherein the third party maintains control over data related to the third party credit product.

16. The non-transitory computer-readable medium of claim 14, wherein the causing the third-party credit product to be presented further comprises causing the online merchant site to access the central database to obtain the information associated with the third-party credit product.

17. The non-transitory computer-readable medium of claim 16, the operations further comprising:
in response to receiving, from the one or more servers, an update corresponding to the information associated with the third-party credit product, updating a record in the central database corresponding to the information associated with the third-party credit product.

18. The non-transitory computer-readable medium of claim 16, the operations further comprising providing the one or more servers with access, via the secure network, to the information in the central database associated with the third-party credit product.

19. The non-transitory computer-readable medium of claim 14, the operations further comprising:
pre-populating user data into one or more fields of an application for the third-party credit product, wherein the user data is obtained from the transaction associated with the online merchant site; and
providing the pre-populated application to the online merchant site for presentation to the user via the user device.

20. The non-transitory computer-readable medium of claim 18, the operations further comprising causing a notification indicating that the third-party credit product has been used in association with the transaction to be provided to the user device in response to the processing the response and at least a portion of the transaction.

\* \* \* \* \*